United States Patent
Mullis, II et al.

(10) Patent No.: US 11,886,703 B1
(45) Date of Patent: Jan. 30, 2024

(54) STORAGE INSURANCE AND POOL CONSUMPTION MANAGEMENT IN TIERED SYSTEMS

(71) Applicant: EMC Corporation, Hopkinton, MA (US)

(72) Inventors: Samuel L. Mullis, II, Raleigh, NC (US); David Haase, Fuquay, NC (US); Michael C. Brundage, Cary, NC (US); Dayanand Suldhal, New Canaan, CT (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/755,914

(22) Filed: Jun. 30, 2015

(51) Int. Cl.
*G06F 12/00* (2006.01)
*G06F 3/06* (2006.01)

(52) U.S. Cl.
CPC .......... *G06F 3/0608* (2013.01); *G06F 3/0644* (2013.01); *G06F 3/0689* (2013.01)

(58) Field of Classification Search
CPC .......... G06F 2009/4557; G06F 3/0631; G06F 12/0246; G06F 2212/7208; G06F 12/1684; G06F 3/0608; G06F 3/067; G06F 3/0683; G06F 3/0685; G06F 3/0686; G06F 3/0688; G06F 3/0689; G06F 11/1076; G06F 11/108; G06F 11/1084; G06F 11/1088; G06F 11/1092; G06F 11/1096; G06F 2211/1095; G06F 2211/109; G06F 2211/1088; G06F 2211/1085; G06F 2211/1083; G06F 2211/1078; G06F 2211/1076; G06F 2211/1073; G06F 2211/1071; G06F 2211/1069; G06F 2211/1066; G06F 2211/1064; G06F 2211/1061; G06F 11/2053; G06F 11/2056; G06F 11/2058; G06F 11/2061; G06F 11/2064; G06F 11/2066; G06F 11/2069; G06F 11/2071; G06F 11/2074; G06F 11/2076; G06F 11/2079; G06F 11/2082; G06F 11/2084; G06F 11/2087; G06F 2211/1004; G06F 2211/1007; G06F 2211/1009; G06F 2211/1011; G06F 2211/1014; G06F 2211/1016; G06F 2211/1019; G06F 2211/1021; G06F 2211/1023; G06F 2211/1026; G06F 2211/1028; G06F 2211/103;

(Continued)

(56) References Cited

U.S. PATENT DOCUMENTS 7,734,888 B1 * 6/2010 Hamilton ............... G06F 3/0638
711/170
7,949,637 B1 * 5/2011 Burke .................... G06F 3/0605
707/655

(Continued)

*Primary Examiner* — Arvind Talukdar
(74) *Attorney, Agent, or Firm* — Krishnendu Gupta; Nikhil Patel

(57) ABSTRACT

A method is used in managing storage space in storage systems. Storage space reserved by a storage object from a set of storage tiers is evaluated. A data storage system includes the first and second storage tiers configured such that performance characteristics associated with the first storage tier is different from the second storage tier. Based on the evaluation, storage space available and consumed in each storage tier of the set of storage tiers is determined.

20 Claims, 9 Drawing Sheets

(58) Field of Classification Search
CPC ..... G06F 2211/1033; G06F 2211/1035; G06F 2211/1038; G06F 2211/104; G06F 2211/1045; G06F 2211/1047; G06F 2211/105; G06F 2211/1052; G06F 2211/1054; G06F 2211/1057; G06F 2211/1059; G06F 3/0644
See application file for complete search history.

(56) References Cited

U.S. PATENT DOCUMENTS

| | | | | |
|---|---|---|---|---|
| 8,443,163 | B1 * | 5/2013 | Bailey | G06F 3/0605 711/114 |
| 8,645,654 | B1 * | 2/2014 | Bailey | G06F 3/0605 711/165 |
| 8,850,145 | B1 * | 9/2014 | Haase | G06F 11/14 711/162 |
| 9,477,431 | B1 * | 10/2016 | Chen | G06F 3/0685 |
| 2009/0276588 | A1 * | 11/2009 | Murase | G06F 3/0608 711/160 |
| 2014/0156956 | A1 * | 6/2014 | Ezra | G06F 3/065 711/162 |
| 2015/0067281 | A1 * | 3/2015 | Jones | G06F 12/0284 711/156 |
| 2016/0019001 | A1 * | 1/2016 | Goodman | G06F 3/0655 711/114 |
| 2016/0062701 | A1 * | 3/2016 | Patil | G06F 3/0605 711/156 |

\* cited by examiner

STORAGE INSURANCE AND POOL CONSUMPTION MANAGEMENT IN TIERED SYSTEMS

CROSS REFERENCE TO RELATED APPLICATIONS

This application claims the benefit of U.S. Provisional Application No. 62/157,142 entitled AUTOMATIC ELEVATION OF LOCAL LOCK TO TRANSACTION CONTEXT, filed on 5 May 2015, the contents of which are all incorporated herein by reference.

BACKGROUND

Technical Field

This application relates to managing storage space in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different RAID levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each minor disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact.

RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

Presently, there is a trend toward the use of larger operating systems, larger applications or programs, and larger file sizes. Understanding this trend, a storage administrator is likely to request the provisioning (i.e., allocation) of a larger portion of storage space than is currently required for an operating system, for example, with the expectation that the space requirements will grow with upgrades, bug-fixes, the inclusion of additional features, and the like. However, a problem of underuse typically arises when the amount of storage space is fully provisioned and allocated to, but is not used by, an operating system, program, process, or user. In this scenario, the disk storage space is unused by the entity that requested its allocation and is also rendered unavailable for use by any other entity. In such cases, the unused space cannot be simply given back to a common storage pool where it may become accessible to other users. For example, a database installation may require many terabytes of storage over the long term even though only a small fraction of that space may be needed when the database is first placed into operation. In short, the large storage space may eventually be needed, but it is not known exactly when the entire space will be required. In the meantime, the allocated storage space lies unused by the requested user and may not be utilized by any other user.

In recognition of the fact that more storage space may be provisioned for operating systems, programs, and users than can actually be used at first, the concept of a sparsely populated logical unit (LU), such as a mapped LUN (e.g., thin logical unit (TLU), direct logical unit (DLU)), was developed. Unlike the more traditional fully allocated logical unit, which is created by fully provisioning and an entire initial amount of storage area, a sparsely populated logical unit is provisioned at creation but is not allocated any physical storage until the storage is actually needed. Specifically, a TLU resolves this problem by allocating the storage space (e.g., making the memory space physically available) as it is needed when (or shortly before) data is written to the TLU. A TLU is created from a common pool of physical space and starts with minimal amount of physical space. As the application that is using the TLU starts to demand more storage, the TLU incrementally requests the storage space from the common storage pool in portions referred to as slices.

Some data storage systems provide thinly provisioned file systems that are organized based on sparsely populated logical unit such as mapped LUNs. Thinly provisioned file systems typically have very large address spaces but allocate specific storage slices to populate file systems only as storage is needed to satisfy write requests. A thinly provisioned file system may thus have an address space that is measured in petabytes but may allocate slices to occupy only a small fraction of the address space.

Storing, safeguarding and providing access to data is of paramount importance in modern business. Accordingly, sophisticated data storage systems may be employed that provide a high level of flexibility concerning the quantity of storage capacity available to individual users (and individual processes) accessing the data storage system. Unfortunately, such flexibility may result in inefficiencies/conflicts if safeguards are not utilized to ensure proper reporting of space consumed in the data storage system.

SUMMARY OF THE INVENTION

A method is used in managing storage space in storage systems. Storage space reserved by a storage object from a set of storage tiers is evaluated. A data storage system includes the first and second storage tiers configured such that performance characteristics associated with the first storage tier is different from the second storage tier. Based on the evaluation, storage space available in each storage tier of the set of storage tiers is determined.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
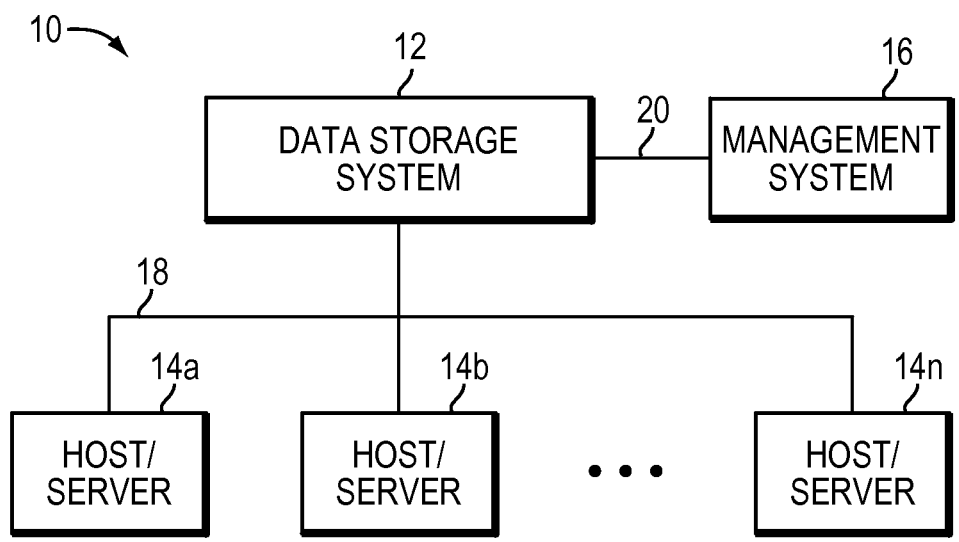
FIGS. 1-2 are examples of an embodiment of a computer system that may utilize the techniques described herein.

Described below is a technique for use in managing storage space in storage systems, which technique may be used to provide, among other things, evaluating storage space reserved by a storage object from a set of storage tiers, where a data storage system includes the first and second storage tiers configured such that performance characteristics associated with the first storage tier is different from the second storage tier, and based on the evaluation, determining storage space available in each storage tier of the set of storage tiers.

Generally, a storage pool is a collection of storage that is provisioned for a logical unit. A storage pool may be a collection of disks, which may include disks of different types. Storage pools may further be subdivided into slices; for example a 1 gigabyte (GB) slice may be the allocation element for a logical unit. Further, a slice may be 256 megabytes (MB) in size. A pool may include a set of storage tiers. A storage pool may include any number of storage tiers such as two storage tiers, three storage tiers, and so on. Further, both a storage tier and a pool may have storage devices of different performance capabilities and costs. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping to the location of the physical drive where it starts and ends.

Generally, slices are allocated to LUNs in a storage pool as "best-fit" at initial allocation time. In at least some cases, since the I/O load pattern of a slice is not known at initial allocation time, the performance capability of storage allocated may be too high or too low for effective data access on a slice. Furthermore, a data access pattern tends to change over time. Older data is accessed less frequently and therefore in at least many cases does not require storage with higher performance capability. Temperature of each storage slice is an indication of hotness of a slice, in other words, frequency and recency of slice I/Os. Better overall system performance can be achieved by placing hot slices to higher tier and cold slices to lower tier. Further, a tiered storage pool may include storage with different performance characteristics such that a logical unit created from storage space provisioned from the storage pool may include slices from different storage tiers with different performance characteristics.

Data migration, i.e., the moving of data from one storage object to another, may be performed at the LUN level or at the slice level. Data migration at the slice level may be performed by copying the data of a slice and then updating an address map of the slice with the new location of the slice. A slice may store data or metadata of the data. I/O operations performed for copying data of a slice in order to relocate the slice are referred to as relocation I/Os. Generally, in order to perform data migration for a storage object such as a slice on which an I/O request from a host system is directed to at the time the slice is being relocated, the slice is mirrored in such a way that two copies of the slices are maintained during relocation of the slice where a source copy refers to the original slice which is targeted for migration and a destination copy refers to a destination slice to which data of the original slice is copied to. Thus, data associated with a write I/O request directed to a portion of a slice which is in a process of being relocated is written to the slice and a destination slice which is mirrored to the slice. It should be noted that "migration" and "relocation" are used interchangeably herein.

Further, a tiered storage pool may include storage with different performance characteristics such that a logical unit created from storage space provisioned from the storage pool may include slices from different storage tiers with different performance characteristics.

Based on configuration of a storage pool and the type of a logical unit of the storage pool, slices may be provisioned for the logical unit either dynamically at the time the logical unit requires slices for allocating storage space or at the time the logical unit is created. Allocating a slice to a logical unit is referred to as provisioning the slice to the logical unit. Thus, a provisioned slice allocated to a logical unit has an owner which may be a file system represented by the logical unit. When a provisioned slice is written to by a host system and includes user data, the provisioned slice is referred to as an allocated provisioned slice. When a provisioned slice has not been written to by a host system and does not include any user data, the provisioned slice is referred to as an unused provisioned slice. A slice residing in a storage pool which is available for provisioning to a logical unit is referred to as an un-provisioned slice.

Further, a pool of storage devices may be organized into multiple RAID groups, and each RAID group may further divided be into a number of LUs from which slices are allocated to one or more mapped LUs for use by users of a storage array. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed. A "direct logical unit" or "DLU" (also referred to herein as "direct mapped LUN" or "thick LUN") is a fully provisioned mapped LU with coarse mapping. Even though a DLU is seen as fully provisioned by a user, internally storage space is allocated on as needed basis. TLUs may have a logical size that is larger than the actual storage size consumed by the TLUs. The actual consumed size is determined by the number of slices actually allocated to a TLU. Thus, an amount of storage space presented to a host of a data storage system using a thin logical volume may be different than the amount of storage space actually allocated to the thin logical volume. The slices that are allocated to a mapped LUN may be physically located anywhere in a storage array.

Further, a snapshot is a point-in-time backup operation that storage system may perform on various objects (e.g., a LUN or a file system). A snapshot in general terms saves differential data between the current status of an object and the status of the object at the time that the snapshot was made.

When storage space is pre-provisioned to a storage object, entire storage space that may be utilized by the storage object and its associated snapshots is allocated for the storage object ensuring that storage space needed by the storage object is available for use by the storage object. While the process of pre-provisioning ensures the availability of storage space required by a storage object, some operations like expanding the size of the storage object may not be possible. Thus, in such a case, storage space pre-provisioned for a storage object is indicated as consumed from a storage tier of a storage pool from which the storage space is allocated from. Alternatively, a storage system may use an insurance based model in which storage space is not allocated to a storage object unless the storage space is actually needed. Instead, a storage system uses an insured storage space associated with a storage object to guarantee availability of the storage space to the storage object. Thus, in such a case, for example, a logical object of size gigabytes (GB) may not have entire 10 GB of storage space allocated to it but the size of the logical object is indicated as 10 GB to a user. In a conventional system, storage space insured for a storage object under an insurance-based model is not allocated from a storage tier of a storage pool to the storage object. Thus, in such a conventional system, storage space of a storage tier insured for a storage object is indicated as available storage space within the storage tier even though the storage space is not available for allocation to other storage objects. However, in such a conventional system, the size of a storage object that is indicated to a user includes any insured space available for subsequent allocations by the storage object. Thus, in such a conventional system, the amount of storage space consumed within a storage tier becomes inconsistent with the total size of a storage object as the storage object accounts for insured storage space but the storage tier does not account for such insured space. Thus, in such a conventional system, when storage space is not allocated to a storage object, the sum of the available storage space remaining within each storage tier of a storage pool becomes inconsistent with the total amount of storage space available in the storage pool based on the storage space consumed from the storage pool by storage objects as indicated to a user. Thus, in such a conventional system, a user may be confused as to the amount of storage space available in a storage pool because the storage space guaranteed for a storage object is indicated as consumed by the storage object and a storage pool that includes such storage object but a storage tier of a storage pool from which storage space is insured for the storage object fails to indicate such storage space as consumed by the storage object. The goal of the current invention is to indicate storage space insured for a storage object as consumed storage space from both a storage pool and a storage tier.

By contrast, in at least some implementations in accordance with the technique as described herein, the current technique consistently reports storage space insured from available storage tiers for a thin provisioned storage objects that are guaranteed availability of storage space based on an insurance-based model. In at least one embodiment of the current technique, storage space insured for thinly provisioned storage objects is distributed among storage tiers of a storage pool based on a storage tier preference of the thinly provisioned storage objects. It should be noted that storage space insured for a storage object not only provides storage space for the storage object but also provides storage space for snapshot copies of the storage object.

In at least some implementations in accordance with the technique as described herein, the current technique determines storage space consumed within storage tiers of a storage pool in such a way that the total amount of storage space indicated as consumed in a storage pool matches the sum of storage space consumed within each storage tier of the storage pool.

In at least one embodiment of the current technique, storage space consumed within each storage tier is estimated based on storage space reserved for space-guaranteed storage objects because a storage system does not guarantee that storage space allocations that have been guaranteed for the space-guaranteed storage objects will come from a specific storage tier as the storage system makes a best effort to allocate storage space from a storage tier preferred by the space-guaranteed storage objects. Thus, in such a system, storage space that has been allocated and not just guaranteed for a storage object is accurately reflected in the total amount of storage space consumed within a storage tier. However, the amount of storage space that has not been yet allocated but insured is estimated within a storage tier based on a criterion such as a tier preference.

Thus, in at least one embodiment of the current technique, storage space insured and guaranteed for a space-guaranteed storage object (such as a thin provisioned storage object) is taken into account when reporting storage space consumed from storage tiers of a storage pool to a user irrespective of whether such insured space has been allocated to the storage object. Thus, the current technique enables a storage system to estimate storage space consumed within each storage tier of a storage pool based on the amount of storage space insured (also referred to herein as guaranteed) for storage objects that has not yet allocated for the storage objects. When a space-guaranteed storage object is created, the amount of storage space insured for the space-guaranteed storage object from a storage pool is no longer available as available storage space to other storage objects. Thus, in at least some implementations in accordance with the technique as described herein, the total sum of available storage space within each storage tier of a storage pool matches with the total amount of storage space available in the storage pool even when individual slices of the storage pool have not been allocated but only reserved as insured storage space.

In at least some implementations in accordance with the technique as described herein, the use of the managing storage space in storage systems technique can provide one or more of the following advantages: improving storage utilization by evaluating tier preferences of a storage object, improving reporting of storage space consumed within storage tiers by accounting for storage space reserved for space-guaranteed storage objects, and reducing and/or eliminating inconsistent reporting of storage space consumed within storage tiers of a storage pool by estimating storage space consumed from each storage tier of a storage pool based on storage space reserved for space-guaranteed storage objects.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated in FIGS. 2-5 and 7-9 describing the current techniques herein, reference may be made to a single data storage array by a vendor, such as by EMC Corporation of Hopkinton, Massachusetts. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Given the different performance characteristics, one or more tiers of storage devices may be defined. The physical devices may be partitioned into tiers based on the performance characteristics of the devices; grouping similar performing devices together. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, MA). In such an arrangement, typically the file based storage hardware operates as a front-end to the block based storage system such that the file based storage hardware and the block based storage system form a unified storage system.

Figure 2:
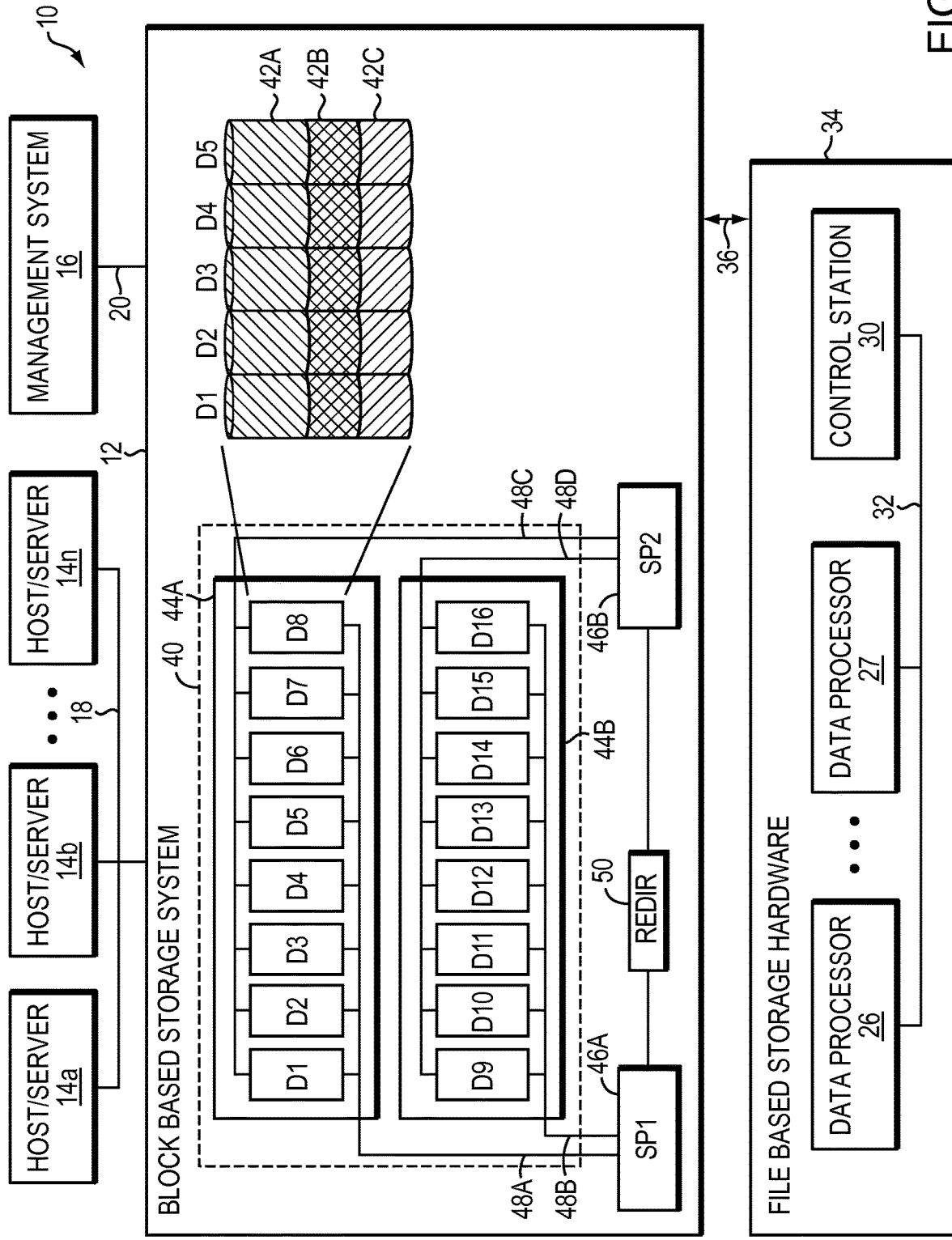

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Massachusetts. While the file based storage hardware 34 may be configured in a variety of ways, in at least one embodiment, the file based storage hardware 34 is configured as a network attached storage (NAS) system, such as a file server system produced by EMC Corporation of Hopkinton, Massachusetts, configured as a head to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14*a*-14*n* and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 2, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 2, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
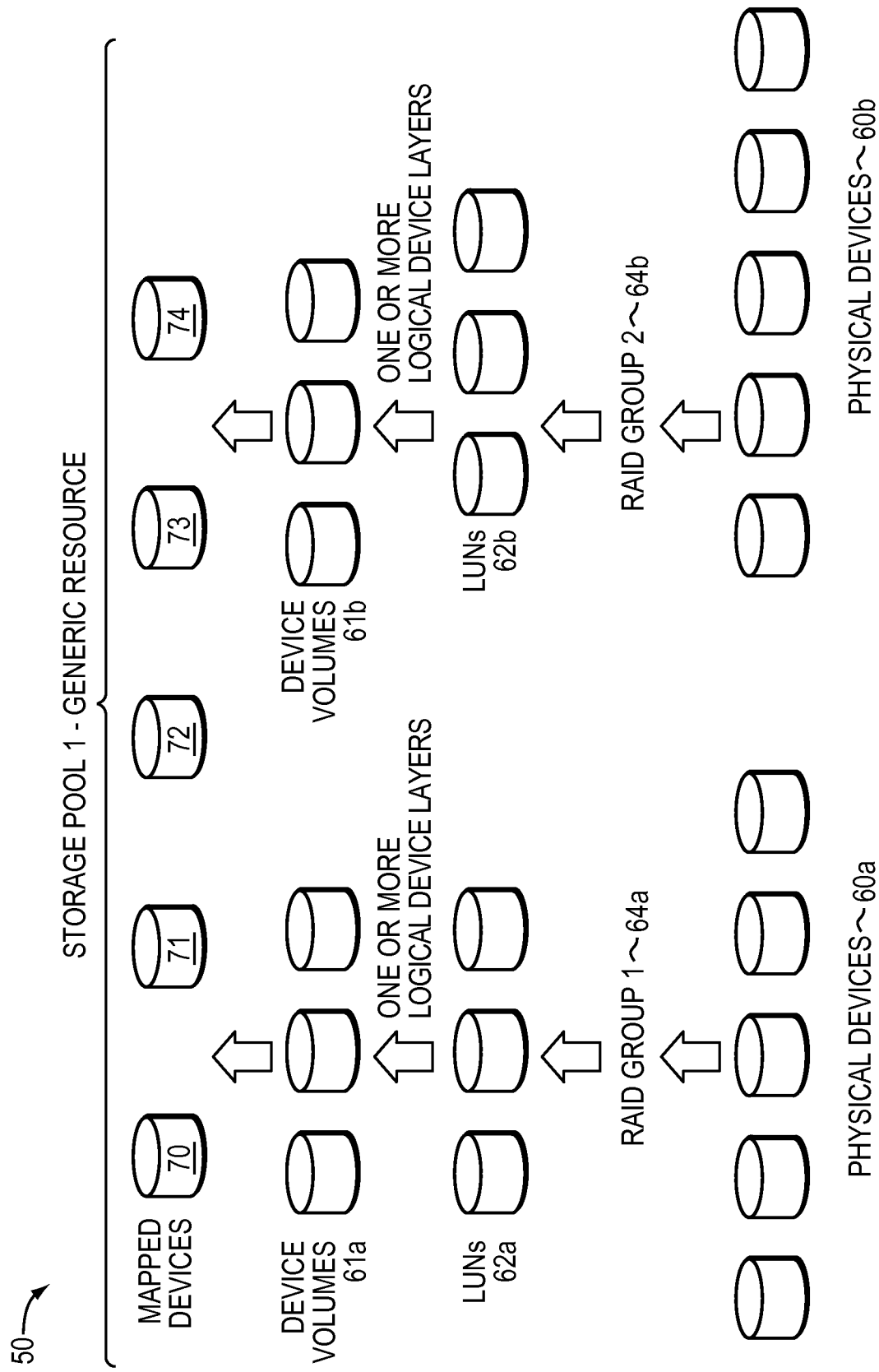
FIGS. 3 and 4 are examples illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consists of a set of storage extents which includes a set of deduplicated LUNs sharing a common set of blocks.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the "thin logical unit" ("TLU") mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the "thin logical unit" ("TLU") mapped device results in either a null pointer (or equivalent) indicating that no corresponding physical storage space has yet been allocated, or results in a reference to a data device which in turn references the underlying physical storage space.

Figure 4:
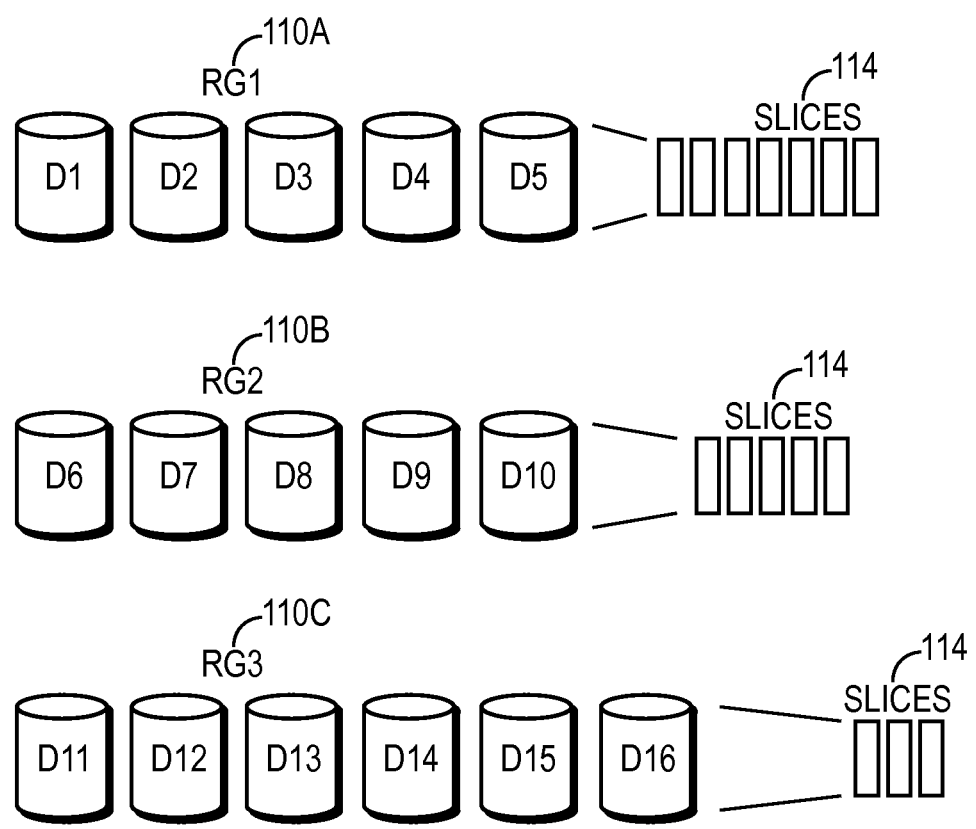

Referring to FIG. 4, shown is a diagram illustrating an exemplary logical division of a storage of a data storage system into storage objects (such as RAID groups) for managing data relocation in the data storage system that may be included in an embodiment using the techniques described herein. With reference also to FIGS. 1-3, for example, storage entities 110 may refer to either a single storage device or a RAID group operating as a single storage device, may be further sub-divided into logical units. A single RAID group or individual storage device may contain one or more logical units (LUs). However, RAID groups need not correspond to LUs and RAID groupings may be further divided into two or more LUs. In addition to RAID groups, each logical unit may be further subdivided into portions of a logical unit, referred to as "slices" 114. Slices 114 may be allocated, de-allocated, re-allocated, reserved, or redistributed by a slice manger. A slice may be, for example, a 1 GB slice of data. However, it should be noted that a slice may be any other size as well, such as 256 megabytes (MB). Further, the techniques described herein should not be construed as being limited to only slices of data; the techniques are equally applicable to other data chunk sizes, such as blocks, slivers (subset of slices), page, file or the like.

Figure 5:
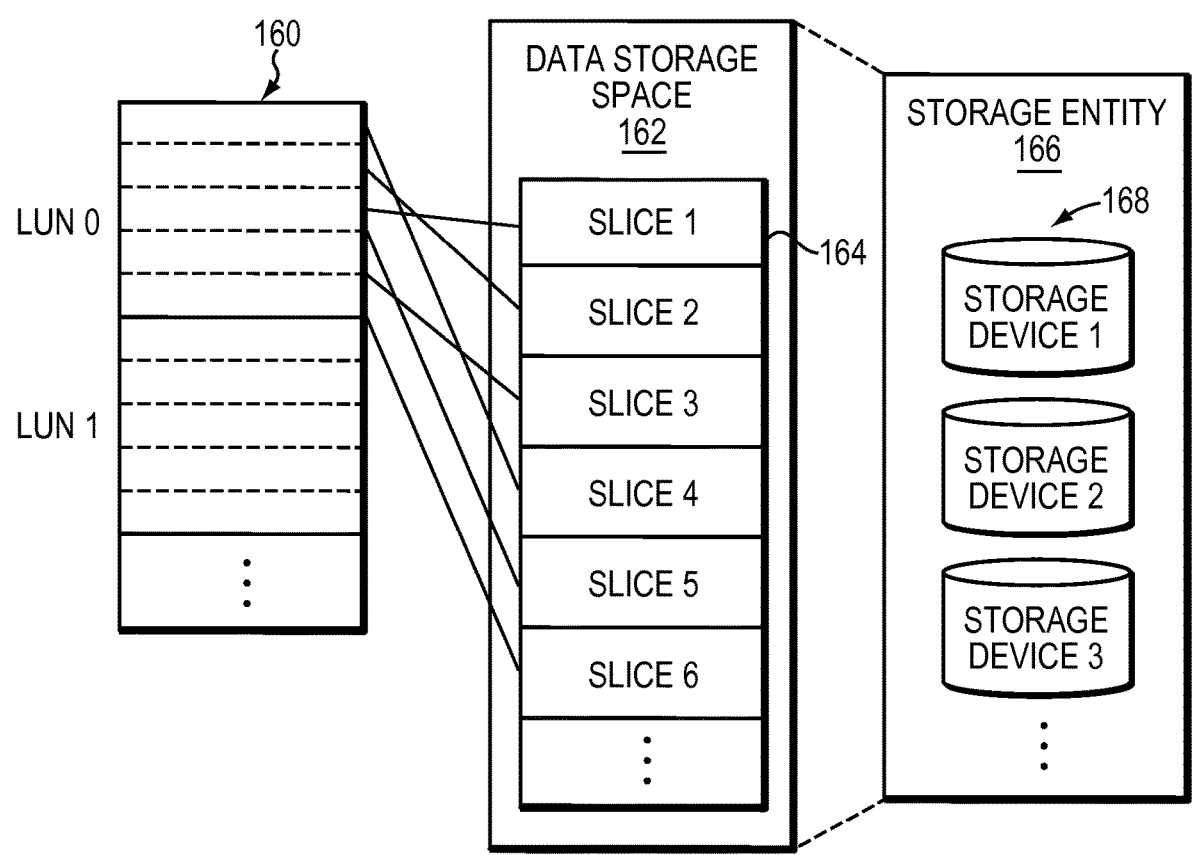
FIG. 5 is a block diagram illustrating in more detail components that may be used in connection with techniques herein.

Referring to FIG. 5, shown is a diagram illustrating another example of logical division of a storage of a data storage system into storage objects (such as RAID groups, storage devices, slices) for managing storage space in storage systems that may be included in an embodiment using the techniques described herein. Data storage system 12 includes a storage entity 166 having data storage space for storing data. Storage entity 166 may include one or more storage devices 168, which may be hard disk drives, flash drives, or other devices capable of storing data. In at least one embodiment, a collection of hard disk drives may be organized into redundant array of inexpensive disks (RAID) arrays. The collective data storage capacity of storage devices 168 is represented by data storage space 162. Data storage space 162 may be divided into portions, hereinafter referred to as slices 164. In at least one embodiment of the current technique, for example, each slice 164 is approximately 1 gigabyte (GB) in size, but other sizes may be used. Slices 164 within data storage space 162 may be organized into logical units (LUs), which are commonly referred to as LUNs 160. In the example illustrated in FIG. 5, data storage space 162 includes two LUNs, LUN0 and LUN1. One or more slices 164 are allocated to each LUN 160. For example, slices 1, 2, and 4 have been allocated to LUN0; slices 3, 5, and 6 have been allocated to LUN1; and slice 7 is unallocated to any LUN. Additionally, each LUN 160 may include slices allocated from different types of storage devices 168. For example, slice 1 allocated to LUN0 at an offset may be allocated from a storage device that is included in a faster storage tier and slice 2 allocated to LUN0 at a different offset may be allocated from a different storage device that is included in a slower storage tier.

In at least one embodiment of the current technique, slice relocation logic (also referred to as "Auto-Tiering policy engine (PE)") may shift hot slices of a logical volume to upper tiers and cold slices of the logical volume down to lower tiers. The goal of the slice relocation process is to put hot, frequently accessed slices to higher tiers and maximize the utilization of these high tiers, which include faster but more expensive drives such as flash storage drives. Slice relocation logic relocates a slice based on the temperature of the slice. The temperature of a slice is determined based on I/O activity directed to the slice. I/O activity of a slice is an indicator of current I/O load of the slice. Slice I/O activity is computed using raw slice statistics. The computation may be done in any of several different ways. The specific computation to use may depend on the system I/O traffic pattern. In at least some cases, the simplest and most straightforward calculation is to use total slice I/O counts as I/O activity, such that the slice I/O load is the moving average of slice I/O counts.

Referring back to FIG. 5, the size of logical objects (e.g., LUNs160) may be increased/decreased depending upon need. For example, if LUN-0 is assigned to a user and the user needs additional storage space, storage system 12 may add additional storage space (e.g., slices) to LUN-0 to increase the size of LUN-0. Conversely, if LUN-1 is assigned to another user and the other user needs less storage space, storage system 12 may remove storage space (e.g., slices) from LUN-1 to decrease the size of LUN-1.

The LUNs defined by storage system 12 (e.g., LUNs 160) may be thinly provisioned (e.g., a thin LUN) or thickly provisioned (e.g., a thick LUN). For example, if LUN-0 is a thinly provisioned LUN, storage management process 10 may define a maximum size for LUN-0, wherein LUN-0 initially has zero slices assigned to it. As a user stores data on LUN-0, storage system 12 may assign slices to LUN-0 to accommodate the storage of data (e.g., up to the maximum size defined for LUN-0). Further, as the user deletes data from LUN-0, storage system 12 may remove (i.e., unassign) slices from LUN-0, so that storage system 12 may use such unassigned slices for other LUNs.

Conversely, if LUN-1 is thickly provisioned, storage system 12 may define a maximum size for LUN-1, wherein LUN-1 is initially assigned the appropriate quantity of data storage space 162 to define the maximum storage capacity of the LUN. Accordingly, storage system 12 may permanently assign enough slices to LUN-1 to accommodate the maximum defined storage for LUN-1 (regardless of the amount of storage actually being used by LUN-1).

Due to the dynamic way in which slices may be assigned to various LUNs defined within data storage space 162, storage system 12 may utilize various processes to ensure that slices are available to LUNs that have guaranteed quantities of storage (e.g., the above-described thickly provisioned LUNs).

Accordingly, storage system 12 may maintain a storage insurance pool within storage entities 168, wherein the storage insurance pool includes storage devices that associate the various slices included within plurality of storage devices 168 with the various LUNs to which they are assigned. Accordingly, in the event that a LUN (e.g., LUN-1) is thickly provisioned and needs 1,000 storage blocks (e.g., slices) to achieve its maximum capacity, these 1,000 storage blocks may be defined within the storage insurance pool as being reserved for LUN-1. Conversely, if a thinly provisioned LUN (e.g., LUN-0) needs additional data storage space (due to a higher level of storage utilization), storage system 12 may process the storage insurance pool to determine which (if any) slices are available for use by LUN-0. Further, if a thinly provisioned LUN (e.g., LUN-0) needs fewer slices (due to a lower level of storage utilization), storage system 12 may process the storage insurance pool to identify these slices that are no longer needed by LUN-0 as being available for use by other LUNs.

While, in this particular example, one storage insurance pool is described, it is understood that the quantity of storage insurance pools may be increased depending upon need and design criteria (e.g., for an accounting storage insurance pool, a legal storage insurance pool, a development storage insurance pool).

Thus, each LUN (when defined) has a storage insurance value associated with it. For example, if the LUN in question is a thick LUN (LUN-1), a storage insurance pool may define enough data storage space (e.g., 1,000 slices) to accommodate the maximum capacity of the LUN in question. Accordingly, the insurance value for LUN-1 may be 1,000 storage blocks. Conversely, if the LUN in question is a thinly provisioned LUN (LUN-0), the storage insurance pool may have zero data storage space assigned to it, as storage blocks are assigned to thinly provisioned LUNs on an as-needed basis. Accordingly, the insurance value for LUN-0 may be zero storage blocks. However, a set of slices may be insured for a thin LUN in such a way that when the thin LUN requires a new slice, insurance for new slice is obtained and the new slice is then allocated. Thus, in such a case, when new slices are required by a thin LUN, insurance for the new slices is first obtained before any new slice is allocated to the thin LUN.

Further, storage system 12 may process a storage operation request (e.g., write request) to associate a storage liability value with the storage operation request and may determine whether the storage operation request should be effectuated based, at least in part, upon the storage liability value of the storage operation request and the storage insurance value of the LUN to be written to.

Generally, a File System provides a mapping mechanism for physical storage that maps a single contiguous address space into one or more logically contiguous address spaces called files. Further, a file includes a logical address space maintained by a file system that represents logically contiguous physical storage. Reservation is a process of reserving a specific amount of storage space in a storage pool for a storage object. The number of mapping pointers included in a file indicates the number of file blocks mapped for the file. The size of a file and the number of metadata blocks required to support the file indicates the maximum number of file blocks for the file. A family is a group of files related by replica relationships. Thus a family may include a working file and a set of replicas of the working file. The total number of file blocks mapped for each file in a family indicates the number of family blocks mapped in the family. File blocks that are shared between a working file and a set of replicas of the working file may be counted more than once when determining the number of family blocks mapped in a family, once for each file that maps a shared file block. The total number of file blocks allocated for a family indicates family allocation.

Further, each file in a file system has an individual liability (referred to as "file liability") representing the total size of holes in the file which represents the maximum amount of additional storage space that may be required to guarantee that the file may be completely written. The maximum file liability is the maximum file liability within a set of files in a family. Further, a family liability represents the total size of blocks currently allocated to a family plus (optionally) additional space required to fill in all holes in a file (base or replica) of the family with the most number of holes (or, a file with the maximum file liability indicated by holes having the largest total size). Thus, a family liability of a family represents the largest amount of space required during and after a rollback operation to ensure a rollback operation will not fail due to lack of storage space and the current working file can be fully and completely written without requiring additional storage space (insurance) from a storage pool. For a thin LUN, the maximum file liability in a family may not be used to compute the family liability. For a thick LUN, the maximum file liability in a family may be used to compute the family liability. Thus, for a thin LUN, there is no guarantee that a user may be able to completely write to a promoted replica, but for a thick LUN, a storage system provides a guarantee that sufficient storage space may be available to completely write any one promoted replica of the thick LUN.

In at least one embodiment of the current technique, family insurance value for a family indicates storage space guaranteed to be available for the family. The storage system 12 may not allow the family liability of a family to exceed the family insurance for the family. Similarly, the family insurance for a family may not exceed the family's backing reservations.

A Direct LUN (DLU) is a mapped LUN including a storage space guarantee for a primary base LUN. In addition, storage space is guaranteed for a promoted replica of such mapped LUN. In at least one embodiment of the current technique, a storage space accounting functionality in a storage system ensures that adequate storage space is available for file systems that are associated with a specific amount of guaranteed storage space. For example, a file system organized on a "thick LUN" (or DLU) includes a guarantee that sufficient amount of storage space will be available to write the entire base LUN, even when a set of snaps are created for the file system and even after rollback operations are performed on any snapshot copies of the file system. Thus, in at least one embodiment of the current technique, a storage space accounting functionality in a storage system includes capability for including but not limited to:

1) determining the amount of storage space in a storage pool that is required to meet the space guarantee for a storage object such as a file, a LUN;
2) ensuring that storage space is available and reserved for a storage object before an operation that requires the storage space is allowed to complete processing on the storage object;
3) tracking storage space such that the storage space is accounted for and not allowed to be used by any other entity or operation in a storage pool; and
4) ensuring that tracking of insurance, liability, and reservation and operations performed on a storage object are consistent across storage processors of the storage system and be able to recover from failures in the storage processors.

One of the use cases for requiring a guaranteed storage space for a storage object includes supporting extension of file system organized over a set of thin LUNs. In order to ensure that I/O operations performed on a file system does not fail due to out of space conditions for lack of available storage space when operating within the guaranteed storage space for that file system and to allow a DLU based file system to expand or shrink, even in the presence of snaps, the storage space accounting feature includes a family liability and family insurance model as described above herein. The family liability and family insurance model indicates that a family tracks how much liability the family has indicated by the storage space currently allocated for the family plus (optionally) additional number of storage blocks that may be required to completely fill the largest amount of holes of a family member (e.g., a file) included in the family. A family also includes an amount of insurance which represents the total number of storage blocks (e.g., slices) that has been guaranteed as available for that family. A family is not allowed to perform an operation that may cause its liability to exceed its insurance. Instead, the family may need to request additional insurance before completing an operation. If the request to receive additional insurance succeeds, the operation continues. However, if the request to receive additional insurance fails, the operation fails to complete.

Figure 6:
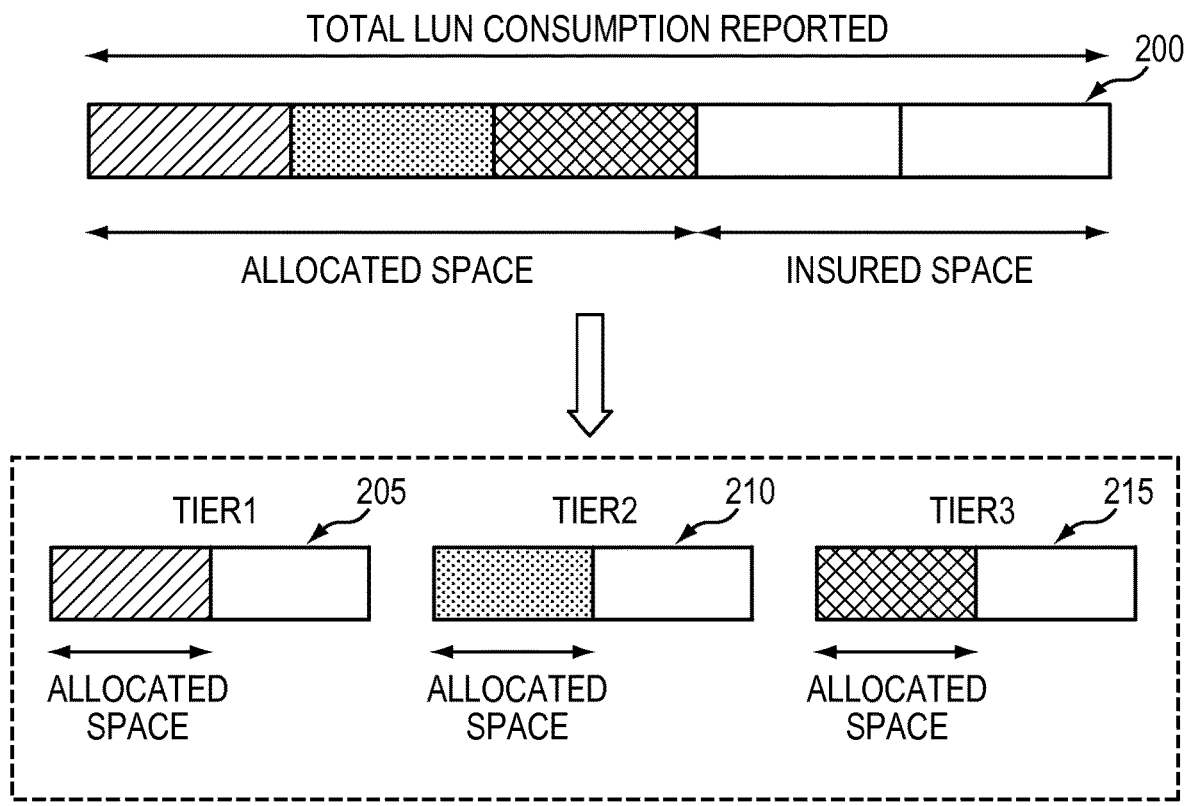
FIG. 6 is a block diagram illustrating a conventional technique for managing storage space in storage systems.

Referring to FIG. 6, shown is a diagram illustrating a conventional example of managing storage space of a data storage system in a conventional system. In the conventional example of FIG. 6, the total amount of storage space consumed for a storage object such as LUN 200 is shown as 5 units of storage blocks (e.g., slices). In this conventional example, the entire amount of storage space consumed by LUN 200 is not actually allocated to LUN 200. Instead, 3 units of storage blocks have been allocated for LUN 200. Further, LUN 200 has 2 units of storage blocks reserved as insured storage space. In this conventional example, each unit of storage blocks allocated for LUN 200 is allocated from respective storage tiers 205, 210, 215 of a storage pool. In such a conventional example, each storage tier 205, 210, 215 indicates allocation of one storage block from respective storage tier and remaining storage space within respective storage tiers is shown as available storage space. Thus, in such a conventional system, storage space consumed within storage tier-1 205 is reported to a user as one unit of storage block, within storage tier-2 210 is reported to a user as one unit of storage block, and within storage tier-3 215 is reported to a user as one unit of storage block. Thus, in such a conventional system, the total amount of storage space consumed within a storage pool including the three storage tiers 205, 210, 215 is reported as 3 units of storage blocks. However, in such a conventional system, the total amount of storage space consumed by LUN 200 created from the storage pool is reported as 5 units of storage blocks. Thus, in such a conventional system, a user receives inconsistent information regarding the amount of storage space consumed within a storage pool and by a LUN organized based on storage space available in the storage pool. Thus, in such a conventional system, a storage system fails to account for storage space insured for a logical object when reporting storage space consumed within storage tiers of a storage pool.

Figure 7:
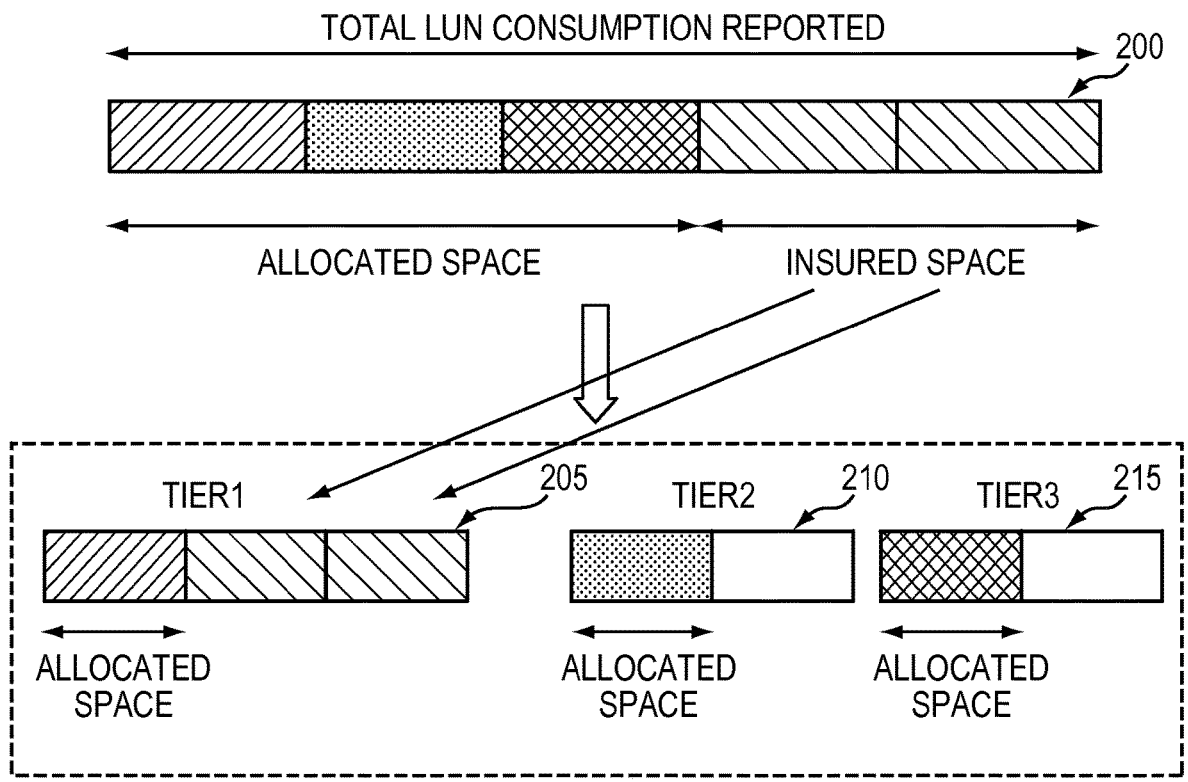
FIGS. 7-8 are block diagrams illustrating in more detail components that may be used in connection with techniques herein.

Referring to FIG. 7, shown is a diagram illustrating an example of managing storage space of a data storage system by using space accounting feature that may be included in an embodiment using the techniques described herein. In the example of FIG. 7, the total amount of storage space consumed for a storage object such as LUN 200 is shown as 5 units of storage blocks (e.g., slices). In this example, the entire amount of storage space consumed by LUN 200 is not actually allocated to LUN 200. Instead, 3 units of storage blocks have been allocated for LUN 200. Further, LUN 200 has 2 units of storage blocks reserved as insured storage space. It should be noted that the storage space reserved for a LUN is not allocated to the LUN. So, for example, 2 units of storage blocks indicated as reserved has not been allocated to LUN 200 yet. In this example, each unit of storage blocks allocated for LUN 200 is allocated from respective storage tiers 205, 210, 215 of a storage pool. In at least one embodiment of the current technique, the amount of storage space reserved for LUN 200 is accounted for within storage tiers of a storage pool based on a criterion and/or a policy. For example, a storage system may first attempt to reserve the entire amount of storage space required for insurance from a lowest storage tier followed by attempting to find any remaining storage space required for insurance from the next storage tier if the lowest storage tier does not include sufficient available storage space. Thus, in the example illustrated in FIG. 7, the two units of storage blocks required for insured space are reserved from storage tier-1 205. Thus, storage space consumed within storage tier-1 205 is reported to a user as three units of storage blocks, within storage tier-2 210 is reported to a user as one unit of storage block, and within storage tier-3 215 is reported to a user as one unit of storage block. Thus, the total amount of storage space consumed within a storage pool including the three storage tiers 205, 210, 215 is reported as 5 units of storage blocks. Further, the total amount of storage space consumed by LUN 200 created from the storage pool is also reported as 5 units of storage blocks. Thus, a user receives consistent information regarding the amount of storage space consumed within storage tiers of a storage pool and by a LUN organized based on storage space available in the storage pool. Thus, in at least one embodiment of the current technique, a storage system accounts for storage space insured for a logical object when reporting storage space available and consumed within storage tiers of a storage pool. Thus, in at least one embodiment of the current technique, storage space reserved by a LUN is deducted from available storage space of a storage tier of a set of storage tiers such that the amount of the storage space deducted from the available storage space of the storage tier is indicated as consumed storage space to a user of the storage tier.

Figure 8:
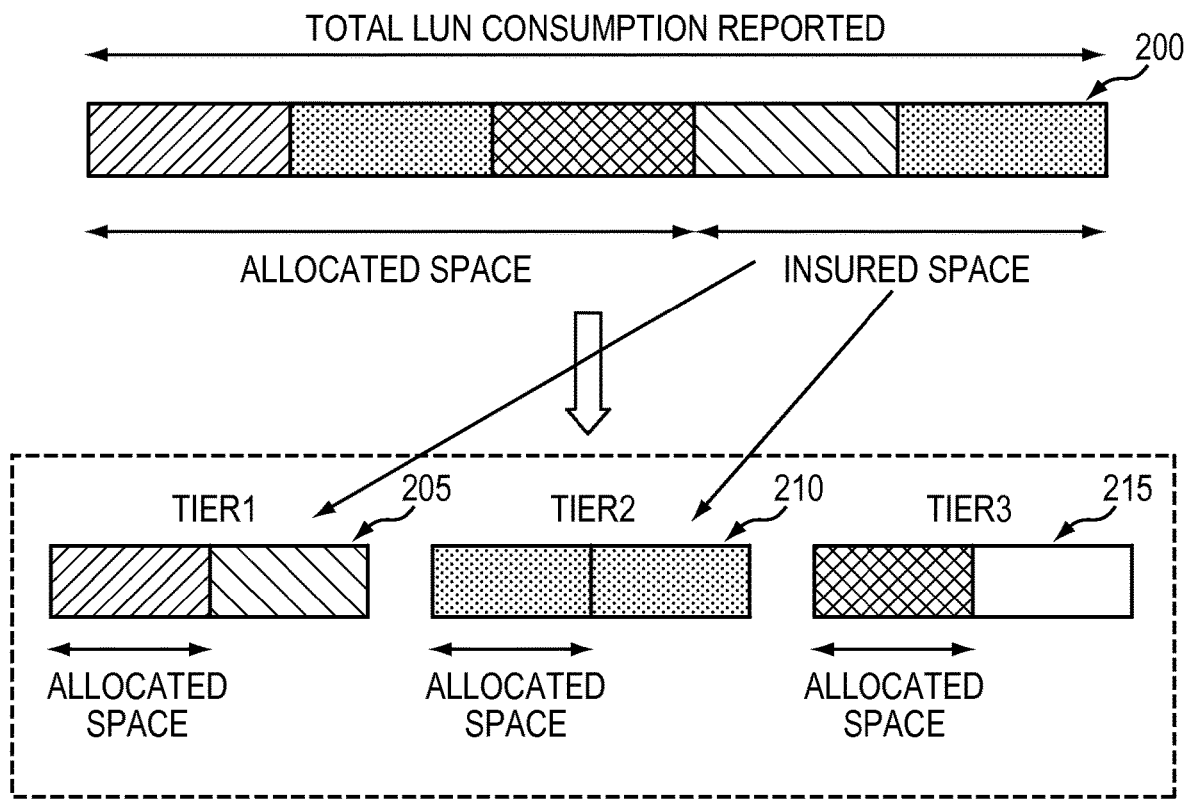

Referring to FIG. 8, shown is a diagram illustrating an example of managing storage space of a data storage system by using space accounting feature that may be included in an embodiment using the techniques described herein. As described in FIG. 7, the amount of storage space reserved for LUN 200 may be accounted for within storage tiers of a storage pool based on a criterion and/or a policy. Thus, the criterion and/or policy may include tier preferences for a LUN such that storage space for insured space is allocated from a storage tier preferred by the LUN subject to availability of storage space with the preferred storage tier. Thus, in the example illustrated in FIG. 8, the two units of storage blocks required for insured space for LUN 200 are reserved from storage tier-1 205 and storage tier-2 210. Thus, storage space consumed within storage tier-1 205 is reported to a user as two units of storage blocks, within storage tier-2 210 is reported to a user as two units of storage blocks, and within storage tier-3 215 is reported to a user as one unit of storage block. Thus, the total amount of storage space consumed within a storage pool including the three storage tiers 205, 210, 215 is reported as 5 units of storage blocks which is same as the total amount of storage space consumed by LUN 200.

Thus, in at least one embodiment of the current technique, the current invention includes a method used for reporting storage space that has been insured from available storage tiers for thinly provisioned storage objects that have been enabled as space guaranteed objects. The storage space guaranteed for each storage object may be distributed among a set of storage tiers of a storage pool based on a storage tier preference of a storage object. The insured storage space for a storage object accounts for storage space required by storage object as well as any storage space guarantees required for snapshot copies of the storage object (and more generally, any additional storage space guarantees that are provided on behalf of the storage object).

In at least one embodiment of the current technique, when determining storage space consumed within a storage tier of a storage pool, a set of storage objects organized within the storage pool are enumerated and for each storage object residing in the storage pool, storage space required for storage space insurance associated with a storage object but not yet allocated is deducted from the remaining available storage space within a storage tier of the storage pool based on a storage tier preference of the storage object. If the storage tier preference of a storage object indicates that the storage object prefers to allocate storage from a highest storage tier within in a storage pool, storage space insured for the storage object is reserved from the highest storage tier followed by lower storage tiers provided sufficient storage space is available in each such storage tier and additional storage space is required to complete reservation of the storage space insurance for the storage object upon reserving storage space from the highest storage tier. However, if the tier preference of a storage object indicates that the storage object prefers to allocate storage from a lowest storage tier within in a storage pool, available storage space in the lowest tier is reserved for the storage object to account for storage space insurance associated with the storage object and upon determining that additional storage space is required, remaining storage space required for the storage space insurance is reserved from higher storage tiers provided sufficient amount of storage space is available in each storage tier and the storage object includes storage space insurance which hasn't been reserved yet.

Thus, as described above herein, if a storage tier has insufficient storage space to satisfy storage space requirement for a storage object based on storage insurance, remaining available storage space within the storage tier is reserved as storage insurance for the storage object and the next storage tier based on a tier preference of the storage object is identified and evaluated for reserving storage space.

Thus, in at least one embodiment of the current technique, the insurance model mathematically guarantees that a storage pool includes sufficient storage space required for providing space guarantees for storage objects residing in the storage pool even though storage space reserved for providing the space guarantees may be distributed across multiple storage tiers with the storage pool. However, it should be noted that there is no guarantee that a slice from a specific storage tier may be available to a storage object for allocation at the time the storage object sends a request to allocate storage space. However, the total amount of storage space required for storage insurance is guaranteed.

Figure 9:
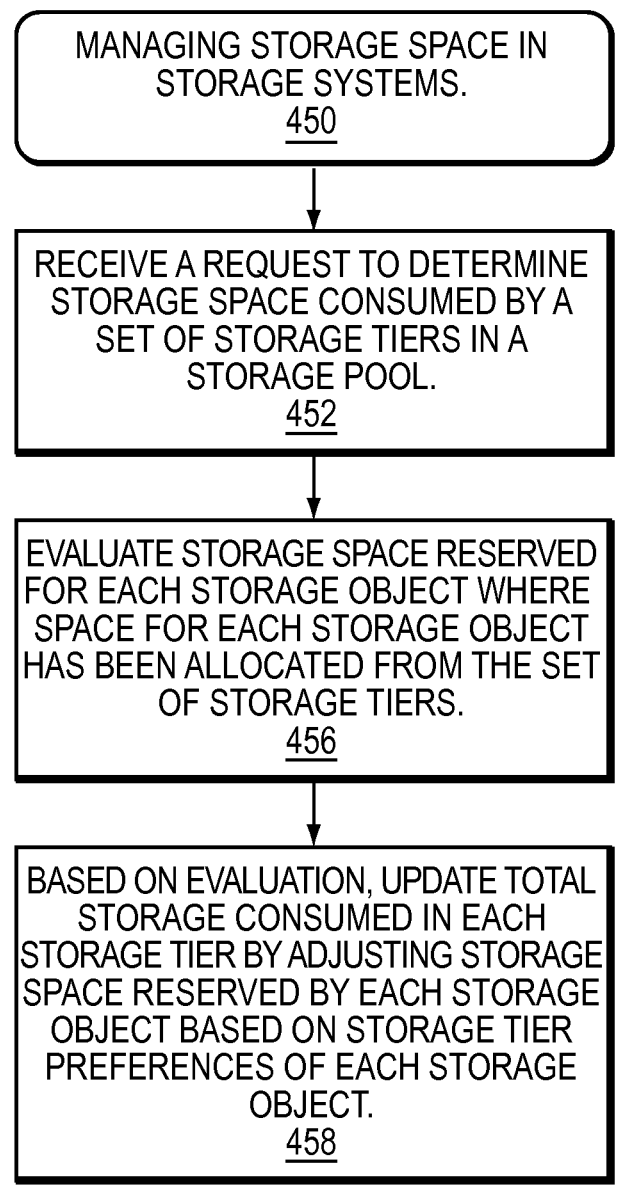
FIG. 9 is a flow diagram illustrating processes that may be used in connection with techniques herein.

Referring to FIG. 9, shown is a flow diagram illustrating a flow of data in the data storage system. With reference also to FIGS. 1-5, in at least one embodiment of the current technique, storage space is managed in a storage system (step 450). A request is received to determine storage space consumed by each storage tier of a set of storage tiers of a storage pool (step 452). The amount of storage space reserved for each storage object organized in the storage pool is evaluated (step 456). Based on the evaluation and a set of criterion and/or policy, the amount of storage space within each storage tier of the set of storage tier which is reported as consumed storage space to a user is updated to account for insured storage space for each storage object (step 458).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing storage space in storage systems, the method comprising:
   receiving a request to determine storage space consumed in a storage pool of a data storage system;
   evaluating storage space of the storage pool reserved by each space-guaranteed storage object of a set of space-guaranteed storage objects to determine amounts of consumed and available storage space, wherein each space-guaranteed storage object may be organized across a set of storage tiers of the storage pool, the first and second storage tiers being configured such that performance characteristics associated with the first storage tier are different from performance characteristics associated with the second storage tier, and wherein the storage space of the storage pool reserved by a subject space-guaranteed storage object includes capacity for the subject space-guaranteed storage object and capacity for snapshot copies of the subject space-guaranteed storage object and wherein the subject space-guaranteed storage object is a logical unit of storage including a logical unit number (LUN);
   determining, for each storage tier of the set of storage tiers, consumed storage space by accounting, for each space-guaranteed storage object corresponding to the storage pool, storage space in each storage tier of the storage pool that is allocated to and that has been reserved for, but not yet allocated to each space-guaranteed storage object;
   providing information regarding the storage space consumed in the storage pool and consumed within each tier of the storage tiers of the storage pool, wherein a total consumed storage space includes a total storage space allocated to and reserved, but not yet allocated to each space-guaranteed storage object corresponding to the storage pool; and
   using an insurance model, providing the storage pool with sufficient storage space required to satisfy capacity requirements of the space-guaranteed storage objects corresponding to the storage pool, wherein the insurance model distributes space guarantees across the storage pool's corresponding set of storage tiers and provides unguaranteed slice availability from any specific storage tiers when one or more of the space-guaranteed object requests storage space allocation.

2. The method of claim 1, wherein a storage insurance value is associated with a space-guaranteed storage object, wherein the storage space reserved by the space-guaranteed storage object is indicated by the storage insurance value.

3. The method of claim 1, wherein determining the storage space available in each storage tier further comprises:
   determining whether free storage space is available in a storage tier for accommodating storage space indicated by a storage insurance value associated with a space-guaranteed storage object; and
   based on the determination, adjusting the amount of consumed storage space in each storage tier.

4. The method of claim 1, wherein a space-guaranteed storage object includes a logical volume, wherein a logical volume comprises a set of slices, each slice of the set of slices is a logical representation of a subset of physical disk storage.

5. The method of claim 1, wherein a set of storage tiers is organized in the storage pool, wherein the storage pool includes a disk drive system comprising a plurality of Redundant Array of Inexpensive Disks (RAID) systems, each RAID system of the plurality of RAID systems having a first disk drive and a second disk drive.

6. The method of claim 1, wherein a space-guaranteed storage object is chosen from a group consisting of a thin LUN and a thick LUN.

7. The method of claim 1, wherein the sum of storage space consumed by each space-guaranteed storage object organized in the set of storage tiers equals the sum of storage space indicated as consumed by each storage tier of the set of storage tiers.

8. The method of claim 1, wherein a storage tier is selected from the set of storage tiers based on a tier preference of a space-guaranteed storage object for reserving storage space indicated by a storage insurance value associated with the space-guaranteed storage object.

9. The method of claim 1, wherein the total amount of storage consumed by a space-guaranteed storage object is indicated by the amount of storage space allocated to the space-guaranteed storage object and the amount of storage space reserved for the space-guaranteed storage object based on a storage insurance value associated with the space-guaranteed storage object, wherein the space-guaranteed storage space reserved for the space-guaranteed storage object has not yet been allocated to the space-guaranteed storage object.

10. The method of claim 1, further comprising:
reporting the total amount of storage space available and consumed in the set of storage tiers to a user of the data storage system.

11. A system for use in managing storage space in storage systems, the system comprising:
a processor configured to:
receive a request to determine storage space consumed in a storage pool of a data storage system;
evaluate storage space of the storage pool reserved by each space-guaranteed storage object of a set of space-guaranteed storage objects to determine amounts of consumed and available storage space, wherein each space-guaranteed storage object may be organized across a set of storage tiers of the storage pool, the first and second storage tiers being configured such that performance characteristics associated with the first storage tier are different from performance characteristics associated with the second storage tier the second storage tier, and wherein the storage space of the storage pool reserved by a subject space-guaranteed storage object includes capacity for the subject space-guaranteed storage object and capacity for snapshot copies of the subject space-guaranteed storage object and wherein the subject space-guaranteed storage object is a logical unit of storage including a logical unit number (LUN);
determine, for each storage tier of the set of storage tiers, consumed storage space by accounting, for each space-guaranteed storage object corresponding to the storage pool, storage space in each storage tier of the storage pool that is allocated to and that has been reserved for, but not yet allocated to each space-guaranteed storage object;
information regarding the storage space consumed in the storage pool and consumed within each tier of the storage tiers of the storage pool, wherein a total consumed storage space includes a total storage space allocated to and reserved, but not yet allocated to each space-guaranteed storage object corresponding to the storage pool; and
using an insurance model, provide the storage pool with sufficient storage space required to satisfy capacity requirements of the space-guaranteed storage objects corresponding to the storage pool, wherein the insurance model distributes space guarantees across the storage pool's corresponding set of storage tiers and provides unguaranteed slice availability from any specific storage tiers when one or more of the space-guaranteed objects requests storage space allocation.

12. The system of claim 11, wherein a storage insurance value is associated with a space-guaranteed storage object, wherein the storage space reserved by the space-guaranteed storage object is indicated by the storage insurance value.

13. The system of claim 11, wherein determining the storage space available in each storage tier further comprises:
determine whether free storage space is available in a storage tier for accommodating storage space indicated by a storage insurance value associated with a space-guaranteed storage object; and
based on the determination, adjust the amount of consumed storage space in each storage tier.

14. The system of claim 11, wherein a space-guaranteed storage object includes a logical volume, wherein a logical volume comprises a set of slices, each slice of the set of slices is a logical representation of a subset of physical disk storage.

15. The system of claim 11, wherein the set of storage tiers is organized in the storage pool, wherein the storage pool includes a disk drive system comprising a plurality of Redundant Array of Inexpensive Disks (RAID) systems, each RAID system of the plurality of RAID systems having a first disk drive and a second disk drive.

16. The system of claim 11, wherein a space-guaranteed storage object is chosen from a group consisting of a thin LUN and a thick LUN.

17. The system of claim 11, wherein the sum of storage space consumed by each space-guaranteed storage object organized in the set of storage tiers equals the sum of storage space indicated as consumed by each storage tier of the set of storage tiers.

18. The system of claim 11, wherein a storage tier is selected from the set of storage tiers based on a tier preference of a space-guaranteed storage object for reserving storage space indicated by a storage insurance value associated with the space-guaranteed storage object.

19. The system of claim 11, wherein the total amount of storage consumed by a space-guaranteed storage object is indicated by the amount of storage space allocated to the space-guaranteed storage object and the amount of storage space reserved for the space-guaranteed storage object based on a storage insurance value associated with the space-guaranteed storage object, wherein the storage space reserved for the space-guaranteed storage object has not yet been allocated to the space-guaranteed storage object.

20. The system of claim 11, further configured to:
report the total amount of storage space available and consumed in the set of storage tiers to a user of the data storage system.

\* \* \* \* \*